United States Patent [19]

Wulf et al.

[11] 4,140,173
[45] Feb. 20, 1979

[54] HEATING DEVICE

[75] Inventors: Helmut Wulf, Ostfildern; Wolfgang Weidemann, Fellbach, both of Fed. Rep. of Germany

[73] Assignee: Daimler-Benz Aktiengesellschaft, Fed. Rep. of Germany

[21] Appl. No.: 742,431

[22] Filed: Nov. 17, 1976

[30] Foreign Application Priority Data

Nov. 19, 1975 [DE] Fed. Rep. of Germany ....... 2551911

[51] Int. Cl.² .............................................. F28D 15/00
[52] U.S. Cl. ............................ 165/104 S; 237/12.3 A
[58] Field of Search ........................... 165/104 S, 96; 237/12.3 A; 236/99.17, DIG. 12

[56] References Cited

U.S. PATENT DOCUMENTS

| | | | |
|---|---|---|---|
| 1,743,581 | 1/1930 | Williams | 237/12.3 A X |
| 1,997,003 | 4/1935 | Marquard | 237/12.3 A |
| 3,062,510 | 11/1962 | Percival | 122/32 X |
| 3,610,523 | 10/1971 | Troy | 237/59 X |
| 3,986,665 | 10/1976 | Kofink et al. | 237/12.3 A |

*Primary Examiner*—William E. Wayner
*Attorney, Agent, or Firm*—Craig & Antonelli

[57] ABSTRACT

A heating installation, especially for heating a passenger space in a motor vehicle, with at least one heat-exchanger that is adapted to be connected as a heat-absorbing heat-exchanger to a heat source, preferably to the exhaust gas pipe, and can be provided as a heat-emitting heat-exchanger at any desired place in the passenger space; the heat-exchanger is thereby accommodated in a housing and a medium is provided inside of this housing for the heat transfer which has a high heat-storage capacity and continues to transfer heat to the heat-conducting medium over long periods of time even after termination of the heat supply from the heat source or in case the heat source supplies relatively small quantities of heat.

34 Claims, 5 Drawing Figures

HEATING DEVICE

The present invention relates to a heating installation, especially for heating a passenger space in a motor vehicle, with at least one heat-exchanger, which is adapted to be connected as a heat-absorbing heat-exchanger to a heat source, preferably at the exhaust gas pipe, and may be provided as a heat-emitting or heat-releasing heat-exchanger at any suitable place in the passenger space.

Heating installations of this type are somewhat too sluggish, especially when the heat conveyance takes place by way of heat-pipes. It is therefore appropriate if heat is continued to be supplied into the passenger space at least for a certain period of time in case of a small heat supply from the exhaust-gas pipe or after the shutting down of the engine. These tasks are to be solved according to the present invention, whereby additionally a solution for the absorption of the relative movements between the heat-absorbing heat-exchanger at the engine and the heat-emitting heat-exchanger at the vehicle body is to be realized. Proposals to utilize bendable heat-pipes are known in the art. However, these prior proposals were not satisfactory heretofore either as regards functioning or as regards durability.

The underlying problems are solved according to the present invention in that the heat-exchanger is accommodated in a housing and a medium is provided for the heat transfer within this housing which has a high heat-storage capacity and continues to transfer heat to the heat-conducting means over a longer period of time even after termination of the heat supply or in case of a smaller heat supply from the heat source. The heat-conducting means is appropriately a heat-pipe for this heating system. As to the rest, a liquid with high conductivity, possibly also with a heat-storage capacity, for example, a liquid paraffin may be used as heat transfer medium which remains liquid at every temperature that may occur in the heating system.

For purposes of absorbing the thermal expansion of the heat-pipe, the latter may be connected with the heat-exchanger by means of a bellows, preferably by means of a metallic bellows, whch establishes the connection for the housing to the heat-pipe, movable with respect to the housing as a result of thermal expansion, and which bellows partly surrounds the space filled by the liquid, whose other portion is surrounded by walls of the heat-exchanger.

The heat-transfer medium, however, may also be a latent heat-storage means, for example, a paraffin, which is in the solid phase during the normal temperature and passes over into the liquid phase at higher temperature. For purposes of accommodating the latent heat storage means, the housing of the heat-exchanger is advantageously provided with double walls, between which the latent heat-storage means is accommodated. As to the rest, the heat-exchanger may be so constructed from a structural point of view that the housing, with the double walls, on the one hand, surrounds a heat transfer space, into which housing projects the end of the heat-pipe and in which takes place the heat transfer from the hot exhaust-gases to the end of the heat-pipe and, on the other hand, surrounds in an adjoining section a part of the heat-pipe itself.

For purposes of enhancing the heat transfer from the hot exhaust gases to the heat-pipe, its end projecting into the heat-exhanger may be provided with heat-transfer ribs.

Also in connection with the construction of the heat-transfer ribs, one can also utilize the advantages which a latent heat storage means exhibits, in that also the heat transfer ribs are constructed double-walled and the interior thereof is filled with a medium of high heat-storage capacity, preferably with a latent heat storage substance.

It is possible to still further improve the heat transfer itself from the hot exhaust gases, on the one hand, and the heat medium on the inside of the double wall of the housing, on the other hand, in that a container preferably provided with rib pipes is arranged on the inside of the housing itself, into which projects the end of the heat pipe and which is filled with a liquid of high heat conductivity, for example, with mercury. The extent of the heat transfer can even be controlled within certain limits by means of such an installation if the container or tank is connected by way of a line with a displacement space, whereby the filling degree of the container and therewith the degree of heat transfer is adjustable by means of the piston of the displacement space.

In addition to the medium with high heat-storage capacity, also the housing of the heat-exchanger may serve for purposes of increasing the efficiency of the heat-exchanger if the housing is formed by a material of high heat-storage capacity. In order that the heat stored therein does not radiate toward the outside, it is appropriate to surround the housing of the heat-exchanger with an insulating jacket.

Additionally, for purposes of absorbing the thermal movements, the housing of the heat-exchanger may be connected at least on one side by way of flexible lines, for example, by way of metal bellows, with the exhaust gas lines.

Constructions are known among the latent heat storage means which, after completed heat-up, remain in the liquid phase and pass over into the solid phase only as a result of an external influence and thereby give off heat. Such an installation may be provided in a heat-exchanger according to the present invention so that the possibility exists for a vehicle heating system to release the stored heat to the heating system at a predetermined time, for example, shortly prior to the starting of a cooled-off vehicle.

Accordingly, it is an object of the present invention to provide a heating installation which avoids by simple means the aforementioned short-comings and drawbacks encountered in the prior art.

Another object of the present invention resides in a heating installation which ensures a supply of heat even in case of relatively small amounts of heat supplied from the heating source or, for example, after shutting off the engine.

A further object of the present invention resides in a heating installation which is capable to supply heat to the vehicle passenger space even after the engine is shut down.

Still another object of the present invention resides in a heating device which is simple in construction, yet is capable of absorbing relative movements between the heat-exchanger at the engine, which absorbs the heat, and the heat-exhanger in the vehicle, which gives off the heat.

A still further object of the present invention resides in a heating device of the type described above which excels by long length of life and by fully satisfactory functioning.

Another object of the present invention resides in a heating system of the type described above which is characterized by high efficiency, simplicity in construction and great length of life.

These and other objects, features and advantages of the present invention will become more apparent from the following description when taken in connection with the accompanying drawing which shows, for purposes of illustration only, several embodiments in accordance with the present invention, and wherein.

Figures 4, 5:
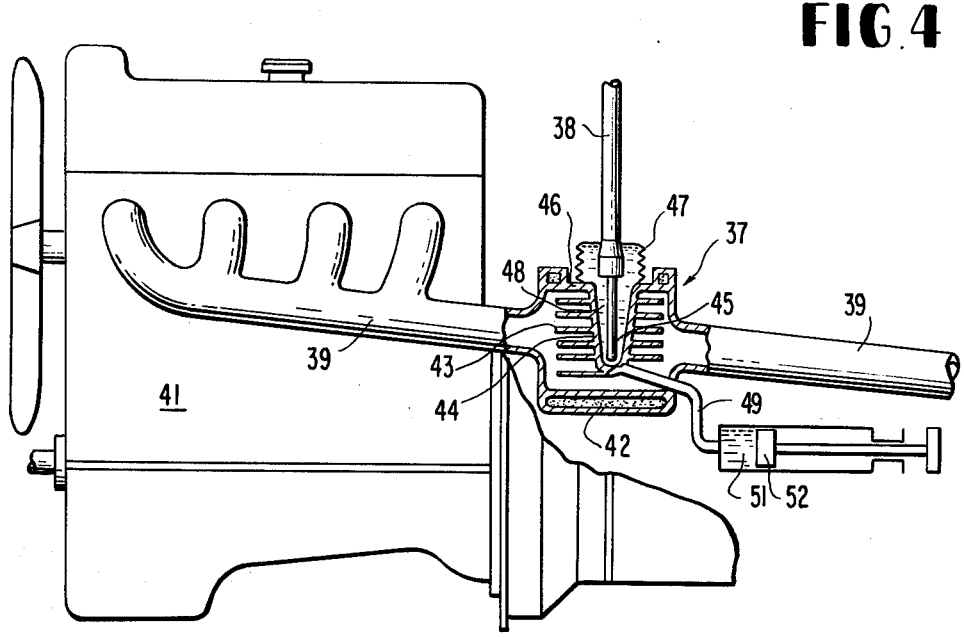

FIG. 4 is a somewhat schematic elevational view of an internal combustion engine with an exhaust gas pipe, into which a heat-exchanger in accordance with the present invention is installed; and FIG. 5 is a somewhat schematic partial elevational view of an internal combustion engine with an exhaust gas pipe, into which a modified embodiment of a heat-exchanger in accordance with the present invention is installed, with a further heat-exchanger in accordance with the present invention which is accommodated in the passenger space.

Referring now to the drawing wherein like reference numerals are used throughout the various views to designate like parts, a heating installation according to the present invention for heating the passenger space of a motor vehicle includes, according to FIG. 5, a heat-exchanger generally designated by reference numeral 1 which is installed as a heat-absorbing heat-exchanger into the exhaust gas manifold 2 shortly after or downstream of the combining of the individual exhaust gas pipes 4 coming from the cylinders of an internal combustion enging 3. A heat-pipe 6 assumes the heat transport or conveyance from the heat-absorbing heat-exchanger 1 to the heat-emitting heat-exchanger 5, which may be accommodated at any suitable place in the passenger space.

A heat-pipe normally consists of a hollow body of copper, stainless steel, or also of heat-proof glass. The inner wall surface of the hollow body is coated with a capillary layer. Both ends of the heat-pipe are closed off air-tight and a small quantity of a liquid adapted to evaporate easily is present in the interior space under a partial vacuum. The liquid is evaporated as a result of the heat absorption at the heat-absorbing heat-exchanger and the thus produced gas conducts the absorbed heat to the second heat-emitting heat-exchanger disposed in the passenger space. During the heat transfer thereat, the gas is again liquefied and the condensate again flows back through the capillary layer to the starting point in the heat-absorbing heat-exchanger.

The heat-exchanger 1 is accommodated in a housing 7 which is made of a material of high heat-storage capacity. The outer wall surface of the housing is surrounded by an insulating layer 8. The end 9 of the heat-pipe 6 projects into the housing 7 of the heat-exchanger 1 and is provided on the inside of the heat-exchanger 1 with heat-exchanging ribs 11.

The housing 7 of the heat-exchanger 1 includes double walls 12 and a medium 13 with high heat-storage capacity is present within the space formed thereby. This medium 13 may be, for example, a liquid paraffin which remains liquid at every temperature occurring in the heating system. However, it may also be a latent heat storage substance, for example, a paraffin which is in the solid phase during the normal temperature and passes over into the liquid phase at higher temperatures.

In the case of the embodiment according to FIG. 5, the heat-exchanger 1 is installed in the motor vehicle. In order that the pipes connected to the heat-exchanger 1 are able to carry out a length compensation in case of temperature changes, the exhaust gas pipe 2 is connected with the heat-exchanger 1 on both sides thereof by way of metallic bellows 14.

As a result of the absorption of heat by the medium 13 with high heat-storage capacity, heat can be continued to be transferred to the heat-conducting heat-pipe also over relatively long periods of time after the termination of the heat supply or in case of a small heat supply from the heat-source exhaust gas, i.e., after the shutting off of the engine, the heating system does not cool off immediately.

Figure 1:
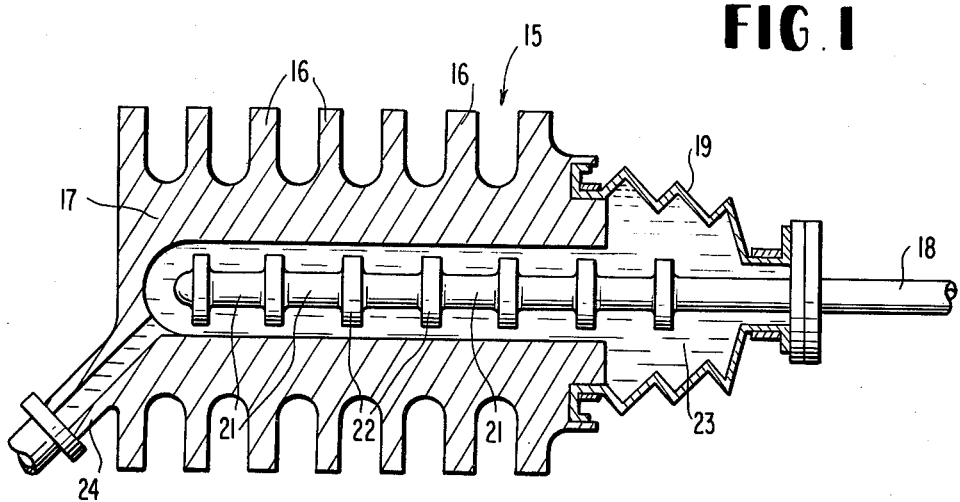
FIG. 1 is a longitudinal cross-sectional view through a heat-exchanger in accordance with the present invention which is filled with a liquid heat-transfer medium of high heat-storage capacity.

A heat-exchanger generally designated by reference numeral 15 is now illustrated in FIG. 1 whose housing 17 provided with ribs 16 is formed of a conventional material of high heat-storage capacity. The heat-pipe 18 is connected to the housing 17 of the heat-exchanger 15 by means of a metal bellows 19. The end 21 of the heat-pipe 18 is also provided with ribs 22 which immerse into a medium of high heat-storage capacity, for example, into liquid paraffin 23 which remains liquid at every temperature occurring in the heating installation. In case of a thermal expansion of the heat-pipe, the latter has the possibility to penetrate more deeply into the liquid 23 and into the housing 17 and/or to absorb movements of the engine whereby the metal bellows 19 is able to follow the movements of the heat-pipe 18. A connecting pipe member 24 is provided by the volume compensation which may lead to a conventional compensating reservoir.

Figure 2:
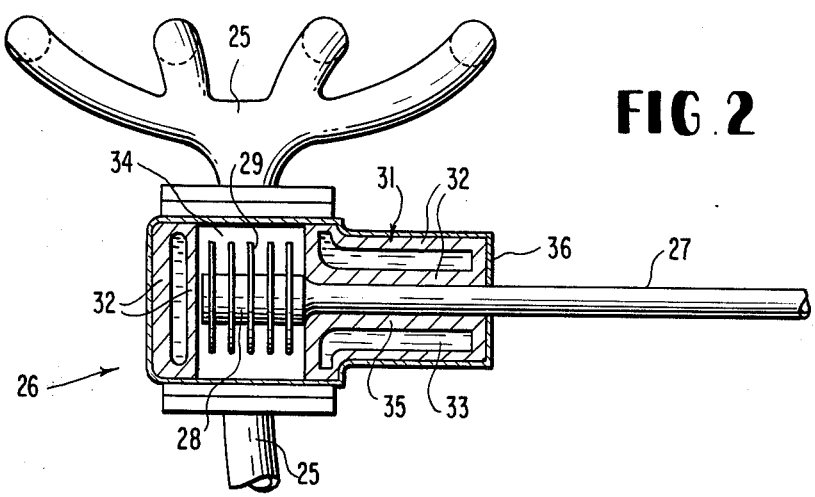
FIG. 2 is a partial cross-sectional view through a heat-exchanger in accordance with the present invention connected to an exhaust gas pipe, which is filled with a latent heat transfer medium having high heat-storage capacity and to which is connected a heat-pipe.
Figure 3:
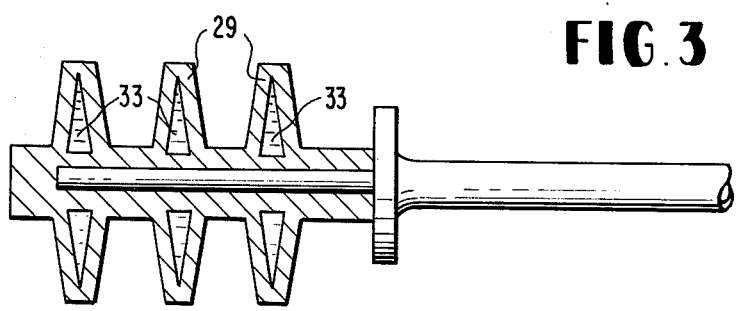
FIG. 3 is an elevational view, partly in cross section, of the end of a heat-pipe in accordance with the present invention, which is provided with hollow ribs that are filled by a heating medium of high heat-storage capacity.

A modification for the construction of the heating installation according to the present invention is illustrated in FIG. 2. A heat-absorbing heat-exchanger generally designated by reference numeral 26 is disposed in the exhaust gas manifold 25, whereby a heat pipe 27 projects into the heat-exchanger 26 with its end 28 which is provided with ribs 29. The housing 31 is provided with double walls 32 forming therebetween spaces which are filled with a medium 33 of high heat-storage capacity. The double walls surround, on the one hand, a heat-transfer space 34, into which projects the end 28 of the heat-pipe 27 and in which takes place the heat transfer from the hot exhaust gases to the end 28 of the heat-pipe 27 with the ribs 29. On the other hand, the double walls surround by means of a section 35 adjoining the heat-transfer space 34, a portion of the heat-pipe 27 adjoining the end 28 thereof. Consequently, the heat transfer takes place thereat, on the one hand, directly by way of the hot exhaust gases to the heat-pipe and, on the other hand, indirectly by way of the medium of higher heat-storage capacity onto the heat pipe. The housing 31 is surrounded by an insulating layer 36. Also the ribs 29 may be provided with double walls as shown in FIG. 3. Also in this case the hollow space formed by the double walls of the ribs 29 is filled with a medium of high heat-storage capacity. This medium may be a liquid substance or a latent heat-storage material which passes over from the solid phase during normal temperature into the liquid phase during higher temperature.

An embodiment is illustrated in FIG. 4 which, in addition to the already described features, includes a regulating possibility, by means of which the heat transfer from the heat-absorbing heat-exchanger generally designated by reference numeral 37 to the heat pipe 38 can be controlled selectively. FIG. 4 again illustrates a heat-exchanger 37 in accordance with the present invention which is installed between two sections of an exhaust gas pipe 39 of an internal combustion engine 41. The heat-exchanger 37 again includes double walls in which is disposed the medium 42 of high heat-storage capacity. Additionally, a container or tank 44 provided with ribs 43 is arranged on the inside of the heat-exchanger 37, into which projects the end 45 of the heat-pipe 38. The container or vessel 46 of the heat-exchanger 37 is connected with the heat-pipe 38 by means of a fold bellows 47 in a manner similar as illustrated in FIG. 1. The interior of the container 44 is filled with a liquid 48 of high heat-conductivity, namely, with mercury. The container 44 is connected by way of a line 49 with a displacement space 51 whereby the degree of filling of the container 44 and therewith the degree of heat-transfer is adapted to be adjusted at will by means of the piston 52 against the displacement space 51.

While we have shown and described several embodiments in accordance with the present invention, it is understood that the same is not limited thereto but is susceptible of numerous changes and modifications as known to those skilled in the art, and we therefore do not which to be limited to the details shown and described herein but intend to cover all such changes and modifications as are encompassed by the scope of the appended claims.

I claim:
1. A heating installation, comprising: at least one heat-exchanger means with a heat-conducting means, said heat-exchanger means being connected as a heat-absorbing heat-exchanger to a heat source and being provided as a heat-emitting heat-exchanger at any desired place, characterized in that said heat-absorbing heat-exchanger is accommodated in a housing means, and two different heat-transfer mediums are provided inside of said heat-absorbing heat-exchanger for the heat transfer, one of said mediums having a high heat-storage capacity and continuing to transfer heat to the heat-conducting means even after the termination of the heat supply or in case of relatively small heat supply from the heat source, the heating installation is for purposes of heating a passenger space in a motor vehicle, the heat source is an exhaust gas pipe connected to an engine of a motor vehicle, and in that the heat-exchanger means includes a heat-pipe means as the heat-conducting means.

2. A heating installation according to claim 1, characterized in that the one heat-transfer medium is a latent heat-storage means which at normal temperature is in the solid phase and at higher temperatures passes over into the liquid phase.

3. A heating installation according to claim 2, characterized in that the one heat-transfer medium is a paraffin.

4. A heating installation according to claim 2, characterized in that the housing means of the heat-absorbing heat-exchanger has double walls, in which is disposed the latent heat-storage means.

5. A heating installation, comprising; at least one heat-exchanger means with a heat-conducting means, said heat exchanger means being connected as a heat-absorbing heat-exchanger to a heat source and being provided as a heat-emitting heat-exchanger at any desired place, characterized in that said heat-absorbing heat-exchanger is accommodated in a housing means, and two different heat-transfer mediums are provided inside of said heat-absorbing heat-exchanger for the heat transfer, one of said mediums having a high heat-storage capacity and continuing to transfer heat to the heat-conducting means even after the termination of the heat supply or in case of relatively small heat supply from the heat source, and in that the heat-exchanger means includes a heat-pipe means as the heat-conducting means.

6. A heating installation according to claim 5, characterized in that the one heat-transfer medium is a latent heat-storage means which at normal temperature is in the solid phase and at higher temperatures passes over into the liquid phase.

7. A heating installation according to claim 6, characterized in that the one heat-transfer medium is a paraffin.

8. A heating installation according to claim 6, characterized in that the housing means of the heat-absorbing heat-exchanger has double walls, in which is disposed the latent heat-storage means.

9. A heating installation according to claim 5, characterized in that the end of the heat-pipe means projects into the heat-absorbing heat-exchanger which is provided with heat-transfer ribs.

10. A heating installation according to claim 5, characterized in that the end of the heat-pipe means has heat-transfer ribs of double-walled construction and in that said heat-transfer ribs are filled on the interior thereof with a medium of high heat-storage capacity.

11. A heating installation comprising:
   a. at least one heat-exchanger means having
      i. a heat-absorbing heat-exchanger connected to a heat source;
      ii. a heat-emitting heat-exchanger provided at any desired place;
      iii. a heat-conducting means connecting said heat-absorbing heat-exchanger with said heat-emitting heat-exchanger;
   b. a heat-transfer medium provided inside of said heat-absorbing heat-exchanger for heat transfer, said medium having a high heat-storage capacity and continuing to transfer heat to the heat-conducting means even after the termination of the heat supply or in case of relatively small heat supply from the heat source; and
   c. bellows means for compensating thermal expansion and engine movements, said bellows means being installed so that it is movable with respect to the heat-absorbing heat-exchanger.

12. A heating installation according to claim 11, characterized in that the heat-transfer medium is a liquid with high thermal conductivity which remains substantially in the liquid phase at every temperature occurring in the heating installation.

13. A heating installation according to claim 12, characterized in that the heat-transfer medium also has a relatively high heat-storage capacity.

14. A heating installation according to claim 13, characterized in that the heat-transfer medium is a liquid paraffin.

15. A heating installation according to claim 13, characterized in that the heat-conducting means is connected with the heat-absorbing heat-exchanger by way of the bellows means, which bellows means establishes a connection from the heat-absorbing heat-exchanger to the heat-pipe means that is movable with respect to the heat-absorbing heat-exchanger and which bellows means partly surrounds a space filled with the liquid, the other portion of the space being surrounded by walls of the heat-absorbing heat-exchanger.

16. A heating installation according to claim 8, characterized in that the bellows is a metal bellows.

17. A heat installation according to claim 11, in which the heat-absorbing heat-exchanger is disposed in a housing means of a double walled construction, characterized in that the housing means, on the one hand, surrounds a heat transfer space, into which projects an end of the heat-conducting means and in which takes place the heat transfer from the hot exhaust gases to the end of the heat-conducting means and, on the other, in an adjoining section thereof surrounds a portion of the heat-conducting means itself.

18. A heating installation comprising:
a. at least one heat-exchanger means having
 i. a heat-absorbing heat-exchanger connected to a heat source, said heat-absorbing heat-exchanger being disposed in a housing means of a double-walled construction;
 ii. a heat-emitting heat-exchanger provided at any desired place;
 iii. a heat-conducting means connecting said heat-absorbing heat-exchanger with said heat-emitting heat-exchanger;
b. a heat-transfer medium provided inside of said heat-absorbing heat-exchanger for heat transfer, said medium having a high heat-storage capacity and continuing to tranfer heat to the heat-conducting means even after the termination of the heat supply or in case of relatively small heat supply from the heat source; and
wherein the heat-absorbing heat-exchanger, on the one hand, surrounds a heat transfer space, into which projects an end of the heat-conducting means and in which takes place the heat transfer from hot exhaust gases to the end of the heat-conducting means and, on the other hand, in an adjoining section thereof surrounds a portion of the heat-conducting means itself.

19. A heating installation according to claim 18, characterized in that the end of the heat-conducting means projecting into the heat-absorbing heat-exchanger is provided with heat-transfer ribs.

20. A heating installation according to claim 19, characterized in that the heat-transfer ribs are constructed double-walled and are filled on the interior thereof with a medium of high heat-storage capacity.

21. A heating installation according to claim 19, characterized in that the heating medium is arranged inside of the double walls of the housing means, and in that a container is arranged on the inside of the housing means, into which projects the end of the heat-conducting means and which container itself is filled with a liquid of high heat-conductivity.

22. A heating installation according to claim 21, characterized in that the last-mentioned liquid with high heat conductivity is mercury.

23. A heating installation according to claim 21, characterized in that the container is provided with ribs.

24. A heating installation according to claim 23, characterized in that the container is connected by way of a line with a displacement space means containing a piston, by means of which the filling degree of the container and therewith the degree of heat transfer is adjustable.

25. A heating installation according to claim 24, characterized in that the housing means of the heat-exchanger means is surrounded by an insulating jacket.

26. A heating installation according to claim 18, characterized in that the heat-transfer medium is a liquid with high thermal conductivity which remains substantially in the liquid phase at every temperature occurring in the heating installation.

27. A heating installation according to claim 26, characterized in that the heat-transfer medium also has a relatively high heat-storage capacity.

28. A heating installation according to claim 26, characterized in that the heat-transfer medium is a liquid paraffin.

29. A heating installation according to claim 18, characterized in that the heat-conducting means is connected with the heat-absorbing heat-exchanger by way of a bellows means which establishes a connection from the housing means to the heat-conducting means, said bellows means being movable with respect to the housing means as a result of thermal expansion and engine movements, and which bellows means partly surrounds a space filled with the other of said heat-transfer mediums, the other portion of the space being surrounded by walls of the heat-absorbing heat-exchanger.

30. A heating installation according to claim 18, characterized in that the housing means of the heat-exchanger means is surrounded by an insulating jacket.

31. A heating installation, comprising at least one heat-exchanger means with heat-conducting means, said heat-exchanger means being operable of being connected as heat-absorbing heat-exchanger to a heat source and of being provided as heat-emitting heat-exchanger at any desired place, characterized in that the heat-exchanger means is accommodated in a housing means, and in that a heat-transfer medium is provided inside of said housing means for the heat transfer which has a high heat-storage capacity and continues to transfer heat to the heat-conducting means even after the termination of the heat-supply or in case of relatively small heat supply from the heat source, characterized in that the heat-exchanger means includes a heat-pipe means as the heat-conducting means, in which the housing means is of double wall construction, characterized in that the heat-transfer medium is arranged inside of the double walls of the housing means, and in that a container is arranged on the inside of the housing means, into which projects an end of the heat-pipe means and which itself is filled with a liquid of high heat-conductivity.

32. A heating installation according to claim 31, characterized in that the last-mentioned liquid with high heat conductivity is mercury.

33. A heating installation according to claim 31, characterized in that the container is provided with ribs.

34. A heating installation according to claim 31, characterized in that the container is connected by way of a line with a displacement space means containing a piston, by means of which a filling degree of the container and therewith the degree of heat transfer is adjustable.

* * * * *